US009900659B1

(12) United States Patent
Norum et al.

(10) Patent No.: US 9,900,659 B1
(45) Date of Patent: Feb. 20, 2018

(54) PERSONALIZED CONTENT APPROPRIATENESS RATINGS

(71) Applicant: Amazon Technologies, Inc., Seattle, WA (US)

(72) Inventors: Steven Preston Lightner Norum, Herndon, VA (US); Dalton James Nikitas, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/535,791

(22) Filed: Nov. 7, 2014

(51) Int. Cl.
*H04N 21/442* (2011.01)
*H04N 21/482* (2011.01)
*H04N 21/475* (2011.01)
*H04N 21/454* (2011.01)
*H04N 21/466* (2011.01)

(52) U.S. Cl.
CPC ....... *H04N 21/4668* (2013.01); *H04N 21/442* (2013.01); *H04N 21/4542* (2013.01); *H04N 21/4755* (2013.01); *H04N 21/4826* (2013.01)

(58) Field of Classification Search
CPC .................................................. H04N 21/4756
See application file for complete search history.

(56) References Cited

U.S. PATENT DOCUMENTS

| | | | | |
|---|---|---|---|---|
| 5,911,043 A * | 6/1999 | Duffy | ..................... | G06Q 30/06 707/E17.109 |
| 6,266,649 B1 | 7/2001 | Linden et al. | | |
| 6,694,090 B1 * | 2/2004 | Lewis | ..................... | G11B 19/02 360/60 |
| 7,779,040 B2 | 8/2010 | Hicks | | |
| 8,644,688 B2 * | 2/2014 | Fishman | ............ | H04N 7/17318 386/296 |
| 8,925,000 B2 * | 12/2014 | Mooneyham | ...... | H04N 21/4348 725/25 |
| 9,674,579 B1 * | 6/2017 | Jaini | ................... | H04N 21/4756 |
| 2003/0115592 A1 * | 6/2003 | Johnson | ................. | H04N 7/163 725/28 |
| 2004/0255322 A1 * | 12/2004 | Meadows | .......... | H04N 7/17309 725/23 |
| 2006/0130119 A1 * | 6/2006 | Candelore | .............. | H04N 7/163 725/135 |

(Continued)

*Primary Examiner* — Brian T Pendleton
*Assistant Examiner* — Alexander Q Huerta
(74) *Attorney, Agent, or Firm* — Kilpatrick Townsend & Stockton LLP

(57) ABSTRACT

Techniques for determining age-content type appropriate ratings for a media on behalf of a user may be provided. For example, information about age-content type appropriate ratings for a plurality of media works may be maintained where the information is associated with a particular user. A determination of whether the particular user has consumed a media work in response to receiving an indication that a user is browsing to the media work in a user interface may be provided. A group that the user belongs to may be identified based on other users that have specified age-content type appropriate ratings for the plurality of media works that are within a range of ratings provided by the user for the plurality of media works. Age-content appropriate ratings for the media work may be determined for the particular user based on an algorithm using the information and the ratings specified by the group.

20 Claims, 8 Drawing Sheets

(56) References Cited

U.S. PATENT DOCUMENTS

| | | | | |
|---|---|---|---|---|
| 2006/0136961 A1* | 6/2006 | Adachi | .................. | H04N 5/775 |
| | | | | 725/28 |
| 2007/0204287 A1* | 8/2007 | Conradt | ............. | H04N 7/17309 |
| | | | | 725/28 |
| 2007/0256093 A1* | 11/2007 | Hiler | .................. | G06F 17/3089 |
| | | | | 725/28 |
| 2008/0127241 A1* | 5/2008 | Garcea | ............... | H04N 7/17318 |
| | | | | 725/24 |
| 2008/0172689 A1* | 7/2008 | Feder | .................. | G06Q 30/02 |
| | | | | 725/28 |
| 2009/0265731 A1* | 10/2009 | Eyer | .................. | H04N 7/163 |
| | | | | 725/28 |
| 2009/0282438 A1* | 11/2009 | White | .................. | G06Q 30/02 |
| | | | | 725/44 |
| 2009/0307726 A1* | 12/2009 | Levin | ................ | H04N 5/44543 |
| | | | | 725/46 |
| 2011/0093337 A1* | 4/2011 | Granit | ............... | G06Q 30/0251 |
| | | | | 705/14.53 |
| 2014/0149425 A1* | 5/2014 | Kalmes | ............ | G06F 17/30029 |
| | | | | 707/748 |
| 2014/0380359 A1* | 12/2014 | Musil | ................ | H04N 21/6582 |
| | | | | 725/34 |
| 2015/0271554 A1* | 9/2015 | Shetty | ................ | G06F 17/3051 |
| | | | | 725/28 |

\* cited by examiner

User A Group Affiliations

PERSONALIZED CONTENT APPROPRIATENESS RATINGS

BACKGROUND

A variety of media works are now available for users to consume from a plurality of streaming services, often leading to marathon viewing sessions. Users are able to stop and start viewing each media work at their leisure, sometimes to catch up on syndicated media works that they missed during the week or to begin exploring a new media work based on recommendations received from other people, such as friends. However, despite the many benefits provided by the media streaming services problems still exist. For example, users may be recommended movies which they find entirely inappropriate for themselves or for fellow family members. Ratings provided by ratings organizations such as the Motion Picture Association of America (MPAA) or the Electronic Software Rating Board (ESRB) fail to encompass the wide range of personal preferences for particular users. Currently provided ratings fail to capture the tolerance or intolerance of a user regarding various content types associated with a media work.

BRIEF DESCRIPTION OF THE DRAWINGS

Various embodiments in accordance with the present disclosure will be described with reference to the drawings, in which.

DETAILED DESCRIPTION

Figure 1:
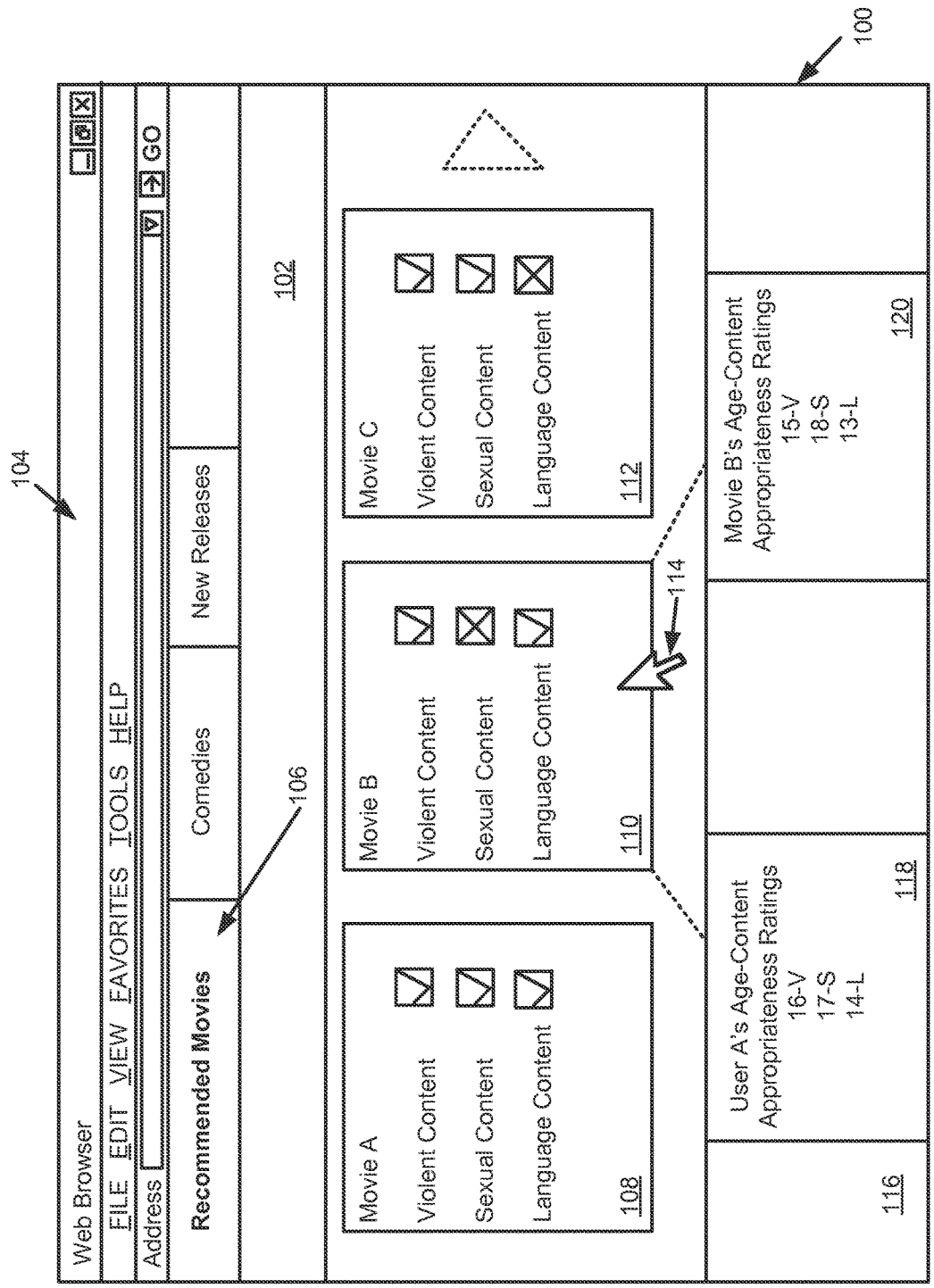
FIG. 1 illustrates an example user interface provided via a network document for providing a content appropriate rating feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for providing content appropriate ratings for media works that may be consumed by a user. In accordance with at least one embodiment, as a user consumes media she may be presented with a user interface (UI) for providing appropriateness ratings information associated with the media work for a variety of content types or categories of the media work. The appropriateness ratings information may include an age-to-content type rating metric for a number of content categories associated with a media work. For example, an illustrative appropriateness rating may include an age (e.g., 18) and a content type (e.g., violent content) that could be represented by the alphanumeric string 18-V. Other examples may include 17-S to represent an age of seventeen for a sexual content type or 15-L to represent an age of 15 for a language content type. A service provider may implement a content appropriate rating feature as well as maintain and update the appropriateness ratings information for the user and others users that utilize the feature. A user may be identified with one or more groups of other users that have rated media works similarly. The groups that the user is associated with may be utilized by the service provider to generate a recommendation that identifies one or more other media works to be provided to the user based on the appropriateness ratings information associated with those other media works identified in the recommendation. In an embodiment, the service provider may update the groups that the user belongs to as well as the user's appropriateness ratings information based on updated ratings received from the user as the user consumes media that may be identified in the recommendation. In embodiments, the service provider may be configured to generate and provide personalized appropriateness ratings for media works as the user browses through the media works within a user interface.

In a non-limiting example, a service provider implementing the content appropriate rating feature may maintain appropriateness ratings information of a user. The information may be received from the user during consumption of a plurality of movies. As the user interacts with a movie streaming or viewing service, the user may be provided with a movie recommendation. The recommendation may identify one or more movies that the user has not yet consumed and may find appropriate based at least in part on the appropriateness ratings information for the user. The recommendation may provide personalized appropriateness ratings associated with the one or more movies to aid in deciding whether to view the recommended movies. If the user decides to view a movie identified in the recommendation they can be presented an opportunity, via a user interface, to provide updated appropriateness ratings information for the recently viewed movie. The updated appropriateness ratings information may be used to update the appropriateness ratings information for the user and to update movies to be identified in subsequent recommendations.

In accordance with at least one embodiment, the service provider may utilize the appropriateness ratings information of a user to provide a parental control feature. For example, the user may utilize the parental control feature to prevent the display, provision, or consumption of media works that have appropriateness ratings that exceed their personal appropriateness ratings. In an embodiment, the service provider may generate and maintain a plurality of user profiles derived from aggregate appropriateness ratings information provided by a plurality of users. A user may select a user profile, which may adjust the appropriateness ratings of the user and may affect the recommended media works and the parental control feature. In embodiments, a user may be enabled, via the user interface, to provide content avoidance tags associated with an account of the user. The service provider may utilize the content avoidance tags to modify or update the recommended media works or to prevent certain media works from being provided/consumed via the parental control feature. For example, a user can indicate a no-drug content avoidance tag for their account which the service provider will utilize to prevent recommending media works that contain drug content. As used herein, a "media work" includes a movie, a television show, a sporting event, an animated film, video game, music, comedy event, lecture series, entertainment convention event, theatre presentation, or any live broadcast or media stream of media works as described herein.

FIG. 1 illustrates an example user interface 100 provided based at least in part on content of a network document 102 generated by the service provider for providing a content appropriate rating feature in accordance with at least one embodiment. In FIG. 1 the network document 102 may be provided or displayed via a web browser 104 configured to run on a user device. The network document 102 of FIG. 1 includes a browsing path 106 for a movie streaming service. The browsing path 106 for FIG. 1 indicates that the user is browsing recommended movies that are comedies and new releases. In embodiments, the network document 102 may provide several recommended movies 108-112 for the user based at least in part on appropriateness ratings information of the user (e.g., an appropriateness profile may be generated for the user based at least in part on appropriateness ratings information associated with the user). The recommended movies 108-112 recommended for the user and displayed via the network document 102 may provide descriptive information indicating whether a particular content category type meets or does not meet their personal age-to-content type ratings included in their appropriateness ratings information. For example, Movie A 108 indicates that for three illustrative content type categories (violence, sexual, and language), the user's personal age-to-content type ratings are met, thus the user should find Movie A 108 appropriate.

Movie B 110, displayed via the network document 102, however, indicates that the sexual content type category has an age-to-content type rating that exceeds their personal age-to-content type rating for that category. In accordance with at least one embodiment, a service provider implementing the content appropriate rating feature may recommend media works to a user although some content type categories have ratings that exceed the user's personal age-to-content type rating for the same category. However, the user may be enabled to specify via the user interface or a preference input feature associated with their account that only media works with age-to-content type ratings that meet or are below their personal age-to-content type ratings should be identified in the recommended media works generation. For example, a user may specify that media works are not appropriate to include in a recommendation for them if for three illustrative categories (sex, violence, and language) the age-to-content rating is above 15 (which could be represented as 15-S, 15-V, and 15-L in FIG. 1). In embodiments, the user interface 100 for the content appropriate rating feature may be configured to provide further information about the age-to-content type ratings associated with a media work.

For example, FIG. 1 includes a user input indicator 114 which has selected Movie B 110. In response to receiving input from the user, the user interface 100 may display age-to-content type ratings comparison information 116 for movie B 110. The age-to-content type ratings comparison information 116 may include the user's personal appropriateness ratings information 118 and the selected media work's appropriateness ratings information 120. The age-to-content type ratings comparison information 116 may aid the user in deciding whether to view or consume the particular media work based on the range of variance between his or her own rating for a content type and the indicated rating for the media work. Although FIG. 1 illustrates a specific example of an age-to-content type rating (16-V for example), embodiments also include other age-to-content type rating metrics that can be represented by other types of alpha-numeric strings (such as "Violence 1 star out of 5 stars). The user may utilize the user interface 100 to select a particular media work or movie (108-112) for consumption provided by a streaming service. In embodiments, the user interface 100 may be configured to enable a user to provide updated appropriateness ratings information for the media work upon consuming the media work or at any time during the consumption of the media work.

Figure 2:
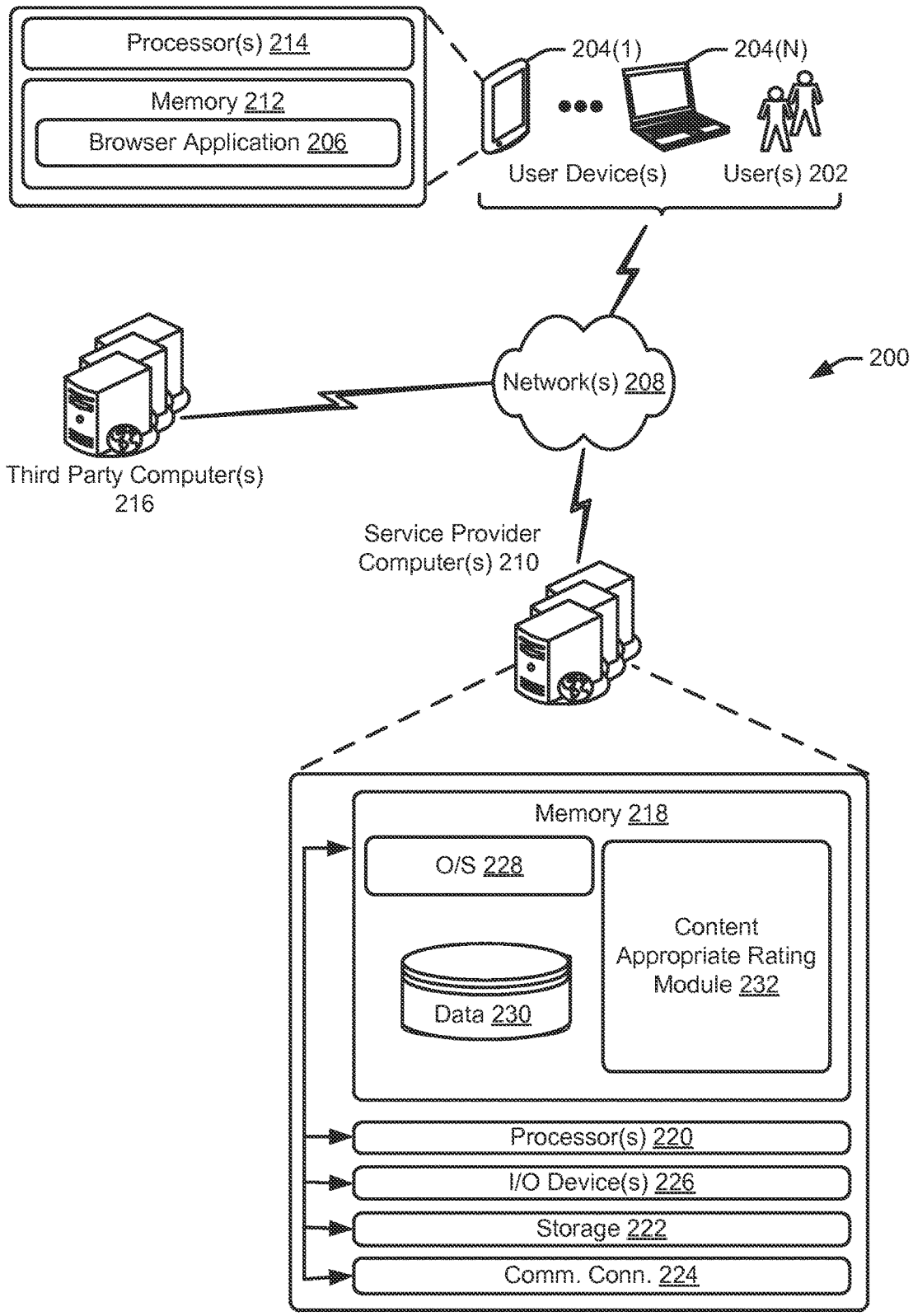
FIG. 2 illustrates an example architecture for implementing a content appropriate rating feature as described herein that includes one or more service provider computers and/or a user device connected via one or more networks in accordance with at least one embodiment.

FIG. 2 illustrates an example architecture for a content appropriate rating feature as described herein that includes one or more service provider computers and/or a user device connected via one or more networks in accordance with at least one embodiment. In architecture 200, one or more users 202 (such as the user described in FIG. 1) may utilize user computing devices 204(1)-(N) (collectively, user devices 204) to access a browser application 206 (e.g., a web browser) or a user interface (UI) accessible through the browser application 206, via one or more networks 208 to provide a network document associated with the content appropriate rating feature as described herein. The "browser application" 206 can be any browser control or native application that can access and display a network document or other information. In some embodiments, the user computing device 204 may be configured to provide a user interface that is enabled to receive a user's appropriateness rating information for a media work they have consumed in accordance with the content appropriate rating feature as described herein. In some aspects, the browser application 206 may display an interactive user interface for providing recommended media works or determined appropriateness ratings information for a media work that a user has not consumed. In some aspects, the browser application 206 may be hosted, managed, and/or provided by a computing resources service or service provider, such as by utilizing one or more service provider computers 210 that are associated with or configured to enable the content appropriate rating feature. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In one illustrative configuration, the user computing devices 204 may include at least one memory 212 and one or more processing units or processor(s) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described herein. The user devices 204 may also include geo-location devices (e.g., a global positioning system (GPS) device or the like) for providing and/or recording geographic location information associated with the user devices 204.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the components of the memory 212 in more detail, the memory 212 may include an operating system and one or more application programs or services for implementing the features disclosed herein including providing media work recommendations or appropriateness rating information associated with a media work and for receiving input regarding updated appropriateness rating information. The browser application 206 may be configured to provide or display a user interface for the user 202 to interact with when browsing media works that are provided or generated by the one or more service provider computers 210 as described herein. Additionally, the memory 212 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the one or more service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to browse media works recommended by the content appropriate rating feature and provided by the one or more service provider computers 210 and receive input regarding the user's personal appropriateness ratings information for consumed media works as describe herein. The one or more service provider computers 210, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user devices 204 such as, but not limited to, a website or network document. The browser application 206 can interact with any type of website that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 210 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 210 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 210 may be in communication with the user device 204 via the networks 208, or via other network connections. The one or more service provider computers 210 may include one or more servers, perhaps arranged in a cluster or as individual servers not associated with one another. The one or more service provider computers 210 may be in communication with one or more third party computers 216 via networks 208. The one or more service provider computers 210 that host the browser application 206 may obtain and provide data to third party computers 216 via networks 208 in accordance with embodiments described herein. The one or more third party computers 216 may be queried for information regarding a media work including transcript information or metadata associated with the media work which may aid the content appropriate rating feature in determining personal appropriateness ratings information for a particular user. For example, the service provider computers 210 may query providers of media works for information, as described herein, via the third party computers 216.

In one illustrative configuration, the one or more service provider computers 210 may include at least one memory 218 and one or more processing units or processors(s) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described. The memory 218 may store program instructions that are loadable and executable on the processor(s) 220, as well as data generated during the execution of these programs. Depending on the configuration and type of the one or more service provider computers 210, the memory 218 may be volatile (such as RAM) and/or non-volatile (such as ROM, flash memory, etc.). The one or more service provider computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 210. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 210 may also contain communication connection(s) 224 that allow the one or more service provider computers 210 to communicate with a stored database, another computing device or server, user terminals and/or other devices on the networks 208. The one or more service provider computers 210 may also include I/O device(s) 226, such as a keyboard, a mouse, a pen, a voice input device, a touch input device, a display, speakers, a printer, etc.

Turning to the contents of the memory 218 in more detail and as will be described in further detail in FIG. 3, the memory 218 may include an operating system 228, one or more data stores 230, and/or one or more application programs or services for implementing the features disclosed herein including a content appropriate rating module 232. In accordance with at least one embodiment, the content appropriate rating module 232 may be configured to receive and maintain appropriateness ratings information for a user regarding a plurality of consumed media works, identify the user into one or more groups of users that have similar appropriateness ratings information for the consumed media works, and generate recommended media works based on the group member's appropriateness ratings information as described herein.

Figure 3:
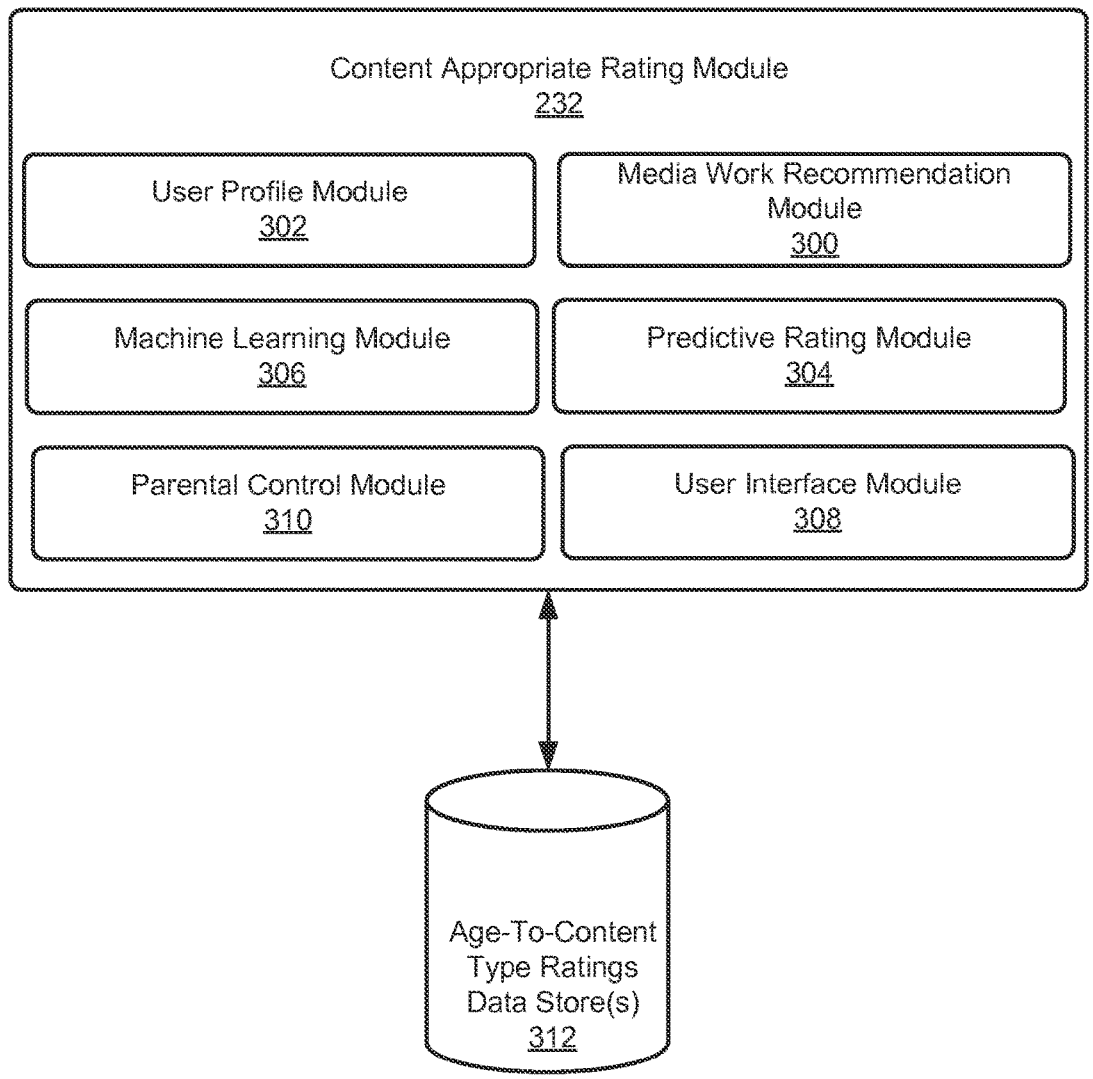
FIG. 3 is a schematic diagram that illustrates an example of a content appropriate rating module and associated data stores in accordance with at least one embodiment.

FIG. 3 is a schematic diagram that illustrates an example of a content appropriate rating module and associated data stores in accordance with at least one embodiment. It should be noted that while multiple modules are described in the example content appropriate rating module 232, the processes and methods described herein can be performed by more or less modules within memory such as memory 218 described above. In addition, while the modules 300-310 included in content appropriate rating module 232 are displayed and described as distinct modules, in some embodiments they may be included within one another to further facilitate methods and systems described herein. In accordance with at least one embodiment, the content appropriate rating module 232 may include a media work recommendation module 300, a user profile module 302, a predictive rating module 304, a machine learning module 306, a user interface module 308, and a parental control module 310 in communication with one or more data stores 312 (which may be an example of the one or more data stores 230 from FIG. 2).

In accordance with at least one embodiment, the content appropriate rating module 232 may be configured to receive and maintain appropriateness ratings information for a plurality of users. The appropriateness ratings information for a user may be received via a user interface generated by user interface module 308 and maintained in the age-to-content type ratings data store 312. The content appropriate rating module 232 may further be configured to query a user for the appropriateness ratings information as the user consumes the media. The content appropriate rating module 232 may weigh the received input regarding the user's appropriateness ratings information based on whether they have completely consumed or viewed the media work. For example, media works may include indicators communicate the amount currently consumed by a particular user. In embodiments, the content appropriate rating module 232 and user interface module 308 may be enabled to provide a user preferences UI which allows a user to specify content avoidance subjects by interacting with avoidance tags that are generated by the content appropriate rating module 232. In accordance with at least one embodiment, the content appropriate rating module 232 may be configured to determine a standard variance of difference between the appropriateness ratings information for the user and a particular group determined by the content appropriate rating feature described herein. For example, if a user lacks sufficient appropriateness ratings information to identify them accurately within one or more groups, the content appropriate rating module 232 may utilize the appropriateness ratings information specified by the user to determine the users variance from a standard group or any group already determined by the content appropriate rating service. The determined standard variance of difference can be utilized to modify a user's appropriateness ratings information to drive recommendations and predictive ratings for media works browsed by the user.

A user preferences UI may be enabled to receive user defined avoidance tags that are not included in the avoidance tags generated by the content appropriate rating module 232. The content appropriate rating module 232 may be configured to maintain an account corresponding to a user associated with the content appropriate rating feature. The accounts maintained by the content appropriate rating module 232 may include the user's appropriateness ratings information, avoidance tag information, and user group affiliations. In accordance with at least one embodiment, the content appropriate rating module 232 may identify a user with one or more groups based on the user's appropriateness ratings information for a plurality of media works and the appropriateness ratings information of other users for the plurality of media works. The machine learning module 306 may be utilized by the content appropriate rating module 232 to identify the user with the one or more groups using the appropriateness ratings information of the user and other users. The machine learning module 306 may associate users together in a group when the user's appropriateness ratings information for a category is within a certain range of each other. For example, a user whose rating for violence is 18 years or older may be grouped together with a user whose rating for violence is 19 years or older. The range of variance between the user's in a group regarding different categories of an age-to-content type rating may be specified by the user or determined by the machine learning module 306 using feedback from the user. For example, if media works are recommended to a user and never consumed because of inappropriateness, the range of variance may be tightened to affiliate the user into groups that are more similar in taste and further provide better recommendations.

The machine learning module 306 may dynamically update a particular user's group affiliations as the machine learning module 306 receives updated appropriateness ratings information. The machine learning module 306 may utilize a supervised machine learning algorithm whose training set of data includes taking an average of all the user's appropriateness ratings information for a plurality of media works and averaging the ratings. The averaged ratings for the user can be used to identify the use with a group of other users whose average ratings match their ratings. The machine learning module 306 may update the group affiliations for the user based on updated appropriateness ratings information received via the UI and content appropriate rating module 232.

In accordance with at least one embodiment, the media work recommendation module 300 may be configured to generate and provide a recommendation for a user that identifies one or more media works that the user will find appropriate. The media work recommendation module 300 may generate the recommendation based on the appropriateness ratings information of the group members that the user is affiliated with. For example, the recommendation may identify media works that other group members have consumed but the user has not because the media work that has not been viewed by the user should have age-to-content type ratings that are appropriate for the user. In embodiments, the media work recommendation module 300 may also utilize the content avoidance tags to further modify the generated recommendation. Utilizing the content avoidance tags can help avoid recommending media works that would otherwise be appropriate to a user according to their specified age-to-content type ratings. The generated recommendation may weigh media works that are derived from different groups differently than media works that are derived from only one group and adjust a ranking or sorting of the media works that are identified in the recommendation to the user according to the weight.

In accordance with at least one embodiment, the user profile module 302 may generate a plurality of user profiles that represent adjustments to age-to-content type ratings included in the appropriateness ratings information of a user. The user profiles may be determined based on aggregated user's appropriateness ratings information and represent a range of adjustments to particular content types identified in the age-to-content type ratings for a user. For example, a safe user profile may be generated that adjusts any given user's age-to-content ratings down by 5 years of age, while a different user profile may adjust a given user's age-to-content ratings up by 2 years of age. The user profile module 302 and content appropriate rating module 232 may update the user profiles and generate new user profiles based on the received appropriateness ratings information from a plurality of users. The user profile module 302 may generate a plurality of user profiles based on the geographic location of the user. For example, aggregate age-to-content ratings from a plurality of users within the same geographic location of the user may be utilized to generate one or more user profiles. In accordance with at least one embodiment, the user profile module 302 and parental control module 310 may be configured to obtain detailed geolocation information indicating what is located at certain geographic locations such as shops, libraries, school, etc. The detailed geolocation information may be utilized to further modify the user profile adjustments to age-to-content ratings to prevent the consumption of certain media works depending on the location that the user is attempting to consume the media. For example, if a user is attempting to consume a media work that generally has 21 age ratings for the plurality of content type categories at an elementary school, the parental control module 310 and user parental control module 310 may prevent the consumption of the media work. The detailed geolocation information may include other restraints placed on particular media works depending on the location that corresponds to the user's geographic location further preventing the consumption of media works that are illegal in certain geographic locations. The detailed geolocation information may be obtained from publicly available information resources.

In accordance with at least one embodiment, the predictive rating module 304 may generate appropriateness ratings information for a media work that a user has not consumed nor have any related group members consumed. In embodiments, the predictive rating module 304 and machine learning module 306 may determine the appropriateness ratings information for a media work as a user browses to a variety of media works in a user interface. The appropriateness ratings information for a media work may be determined based on a machine learning algorithm utilizing appropriateness ratings information of the user and metadata or other information associated with the browsed to media work. For example, metadata associated with the media work may include a link to a transcript of the media work or may itself indicate a number of graphic or sexual scenes as well as other content types discussed or portrayed in the media work. The metadata associated with the media work may include ratings indicated specified by a ratings association and content tags specified for the media work by other users. The content appropriate rating module 232 may be configured to perform image recognition of media works to parse content types or content tags to associate with the media work.

The machine learning algorithm may analyze the user's appropriateness ratings information for media works with similar metadata to generate a predictive personalized appropriateness ratings information for the browsed to media work. The machine learning algorithm may further be configured to utilize avoidance tags to adjust any determined appropriateness ratings information for the browed to media work that includes a user's content avoidance tag. In embodiments, the determined appropriateness ratings information for a browsed to media work not yet consumed by a user may be generated by the predictive rating module 304, machine learning module 306 and the media work recommendation module 300 analyzing the appropriateness ratings information of affiliated group members. If an affiliated group member has consumed the media work, the ratings specified by the affiliated group member for the browsed to media work may be utilized to provide the appropriateness ratings information for the browsed to media on behalf of the browsing user. The predictive rating module 304 may also recommend media works to a user based on the determined appropriateness ratings information determined for unviewed media works and the user's appropriateness ratings information.

The user interface module 308 may generate user interface for providing recommended media works, determined appropriateness ratings information, content avoidance tag specifications, and receiving input regarding user preferences, user profiles, and a parental control feature as described herein. The user interface module 308 may also communicate with streaming services or media provision services to provide or display a variety of media works to a user. In embodiments, the user interface module 308 and the parental control module 310 may be configured for preventing the consumption of media works that do not conform to a user's appropriateness ratings information. In accordance with at least one embodiment, the parental control module 310 may be configured to enable a user to activate a parental control mode for media player devices associated with the content appropriate rating feature described herein.

For example, a user may activate or enable the parental control mode by interacting with a user interface generated by module 308. The parental control module 310 may apply a filter or policy to all selected media works attempting to be consumed by a user that prevents consumption of media works whose indicated appropriateness ratings information is above a user's appropriateness ratings information. A user may also apply a user profile to adjust their age-to-content type rating before activating the parental control feature for adjustments to their usual determined age-to-content type ratings for determining which media works may be consumed by viewers. In embodiments, the parental control module 310 and the content appropriate rating module 232 prevent the consumption of media works that contain any content type that conflicts with a user's content avoidance tag preferences.

Figure 4:
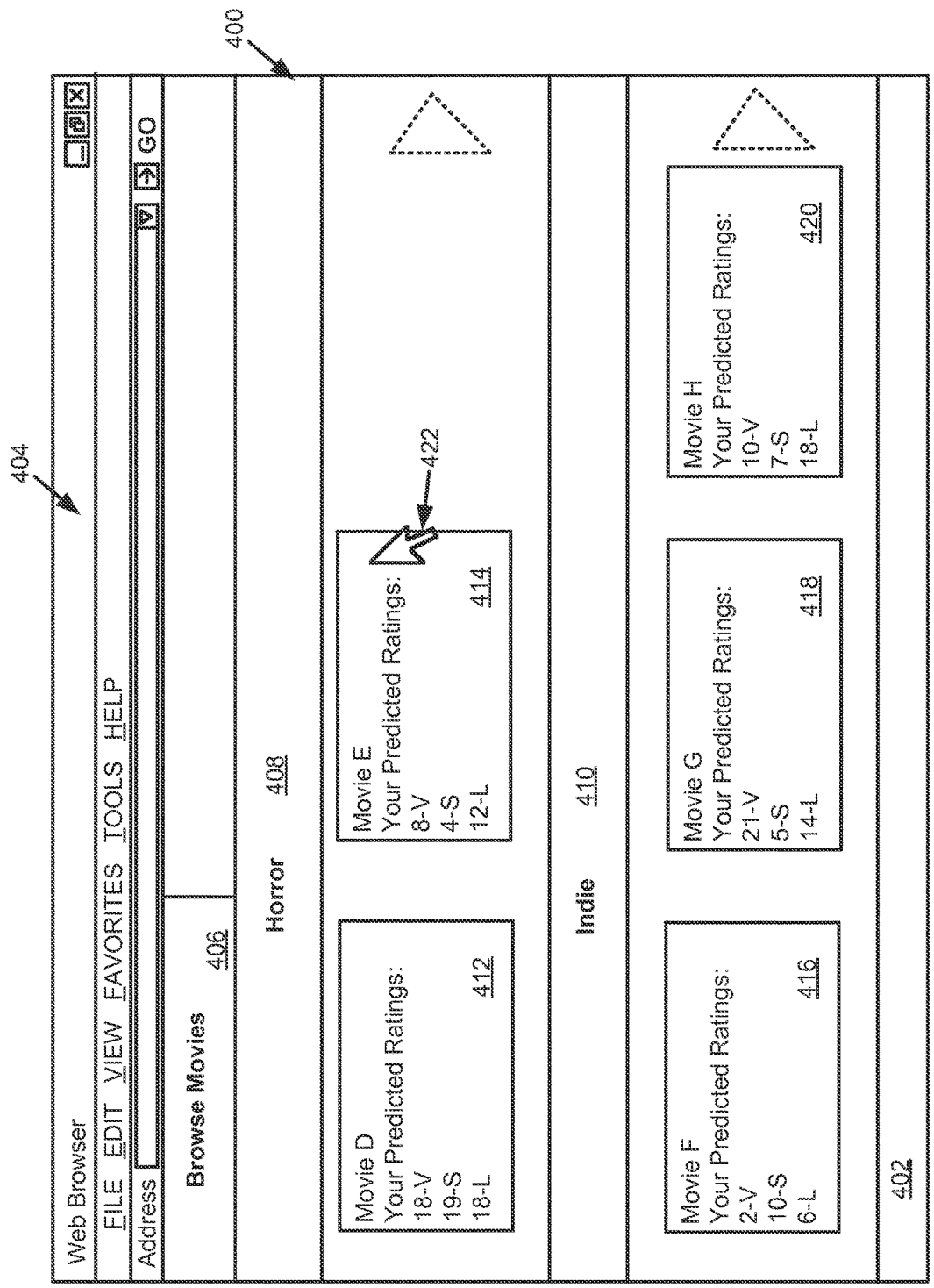
FIG. 4 illustrates an example user interface provided via a network document for providing a content appropriate rating feature in accordance with at least one embodiment.

FIG. 4 illustrates an example user interface 400 displayed via a network document 402 generated by the service provider for providing a content appropriate rating feature in accordance with at least one embodiment. In FIG. 4 the network document 402 may be provided or displayed via a web browser or browser application 404 (which may be an example of the browser application 206 from FIG. 2) configured to run on a user device (which may be an example of user device 204 from FIG. 2). The network document 402 may provide an indicator of a browse mode 406 for different categories of media works 408 and 410. In embodiments, the network document 402 may provide a brief description of a media work as well as personalized predicted appropriateness ratings information 412-420 for a media works that the user is browsing but has not consumed. The user may utilize a input selector 422 to select a media work for display or to receive further information about the media work.

In accordance with at least one embodiment, the user interface 400 via the content appropriate rating module 232 may be configured to enable social networking features for specifying appropriateness ratings information for a user. For example, a user may select Movie E 414 with the input selector 422 and be presented with information describing what a user's social networking contacts have specified as the appropriateness ratings information for Movie E 414. In embodiments, the service provider via the content appropriate rating module 232 may utilize social network information of a user to update the user's appropriateness ratings information. The user interfaces generated by the service provider may allow a user to input social networking information or grant the feature access to the user's social networking information including contact lists or contact information to obtain other user's appropriateness ratings information.

A user may specify their appropriateness ratings information to be similar to a social network contact's appropriateness ratings information rather than specifying their own appropriateness ratings information. By providing the predicted appropriateness ratings information to a user via the user interface 400, a user may efficiently browse to media works that they would find appropriate without referring to ratings provided for the media work by ratings associations, thus providing a personalized experience. The service provider via the content appropriate rating module 232 may be configured to allow a user to specify their appropriateness ratings information according to a target demographic group, various user groups, or affiliations. For example, the user may be provided with age group selections, education level selections, geographic location selections, or any other number of suitable demographic categories for determining the user's appropriateness ratings information. Each demographic category can have a predetermined appropriateness ratings information associated with it by the service provider utilizing aggregate user appropriateness ratings information.

Figure 5:
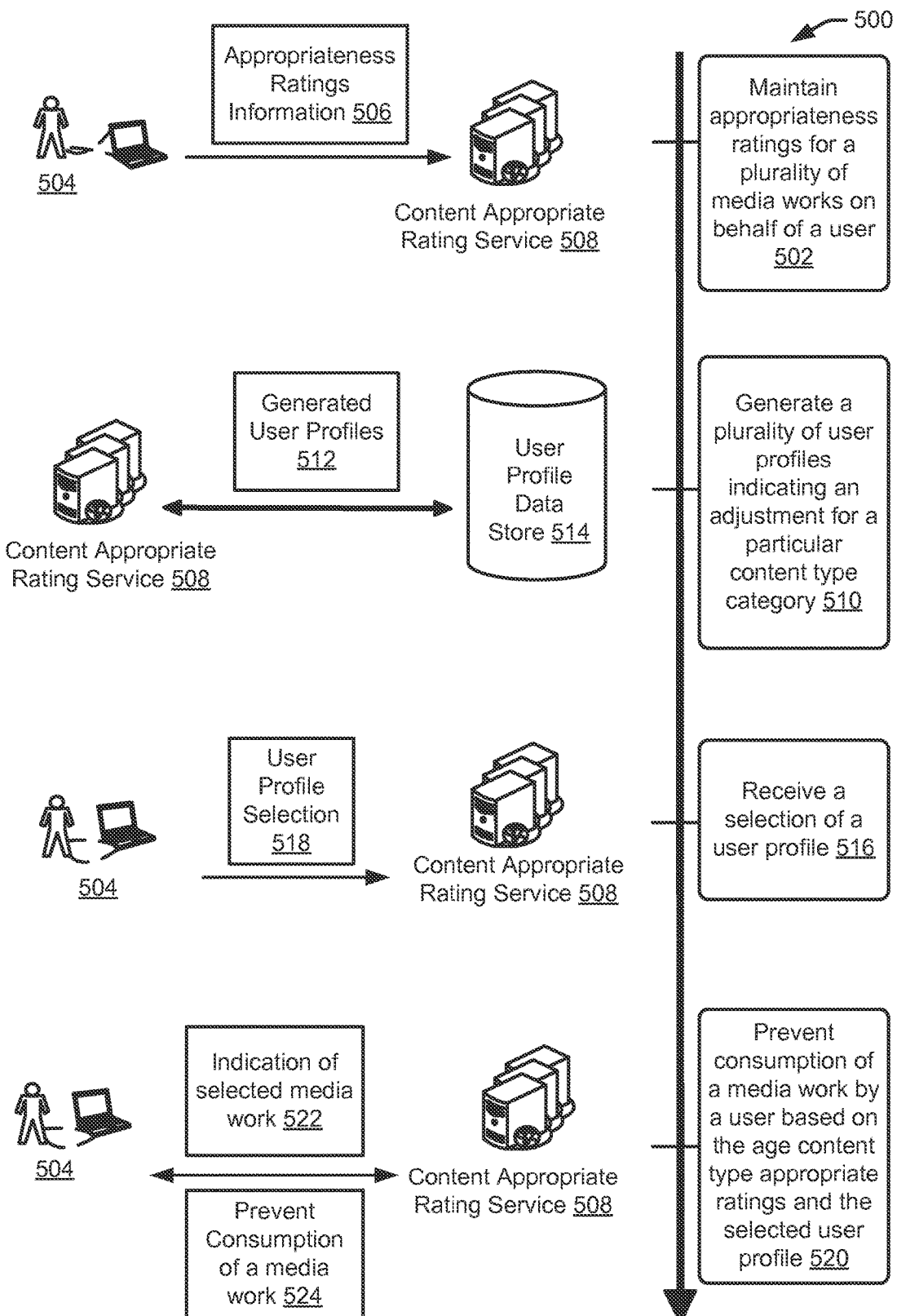
FIG. 5 is an illustrative flow for a content appropriate rating feature in accordance with at least one embodiment.

FIG. 5 is an illustrative flow 500 for a content appropriate rating feature in accordance with at least embodiment. The illustrative flow 500 may begin by maintaining appropriateness ratings information for a plurality of media works on behalf of a user at 502. For example, a user 504 may provide appropriateness ratings information 506 for a recently consumed media work to a content appropriate rating service 508 (implemented by the one or more service provider computers 210 from FIG. 2) to maintain. The flow 500 may continue by generating a plurality of user profiles indicating an adjustment for a particular content type category at 510 of the user's appropriateness ratings information 506. The content appropriate rating service 508 may generate user profiles 512 from aggregated user appropriateness ratings information and maintain the user profiles in a user profile data store 514.

The illustrative flow 500 may include receiving a selection of a user profile from a user at 516. For example the user 504 may interact with a user interface generated by content appropriate rating module 232 to select 518 a generated user profile and the selection may be provided to the content appropriate rating service 508. The illustrative flow 500 may conclude at 520 by preventing the consumption of a media work by a user based on the appropriateness ratings information of the user and the selected user profile. For example, the content appropriate rating service 508 may receive an indication that the user 504 has selected a media work 522, analyze the appropriateness ratings information associated with the media work and prevent consumption of the media work 524 based on a comparison of the user's age-to-content type ratings included in the appropriateness information ratings adjusted by the selected user profile 518. In accordance with at least one embodiment, the content appropriate rating service 508 may generate a notification that includes the user's age-to-content type ratings and the age-to-content type ratings of the selected media work adjusted by the user profile. In some embodiments, the notification may be enabled to allow the user to override the prevention described at 520. For example, the notification may include a text field for entering a user-password or parental control override code that can allow the provision of the selected media work.

Figure 6:
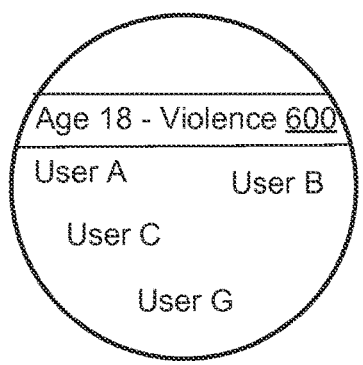
FIG. 6 illustrates examples of group affiliations for a user in accordance with a content appropriate rating feature as described herein.
Figure 6:
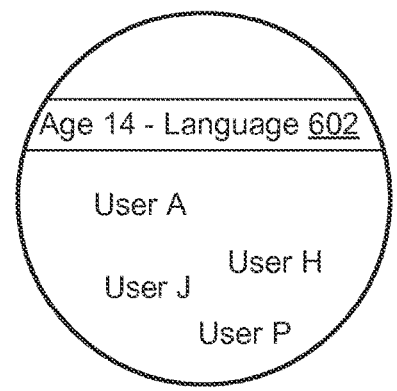
Figure 6:
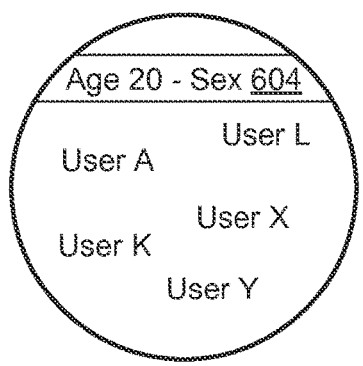
Figure 6:
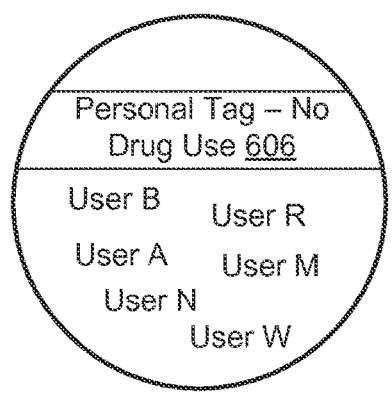

FIG. 6 illustrates examples of group affiliations for a user in accordance with a content appropriate rating feature as described herein. In accordance with at least one embodiment, a user may be identified with one or more groups by a service provider using the content appropriate rating module 232 and a machine learning algorithm. The user may belong to one or more groups at any given time and the groups may be updated by the content appropriate rating module 232 utilizing updated appropriateness ratings information from the user or other group members. FIG. 6 includes four illustrative groups, 600-606 for a User A. FIG. 6 includes a group that User A belongs to because User A's violence age-to-content type rating indicates that they find most media work's violent content to be appropriate for users that are 18 years and older. As described above, some of the users that are identified into group 600 may have a violence age-to-content type rating that is not 18 but may be 19 or 20. The content appropriate rating module 232 may utilize a variance range to identify users together that is either specified by the user themselves or determined by a machine learning algorithm using user feedback.

The illustrative user groups 602 and 604 reflect the wide range of age-to-content type ratings that can be associated with a single user, as FIG. 6 illustrates that the user is grouped with members that rate media works appropriate for 14 years and older regarding language type content 602 and with another group that rate media works appropriate for 20 years and older regarding sexual type content 604. In accordance with at least one embodiment, the service provider may identify the user into a group with other users that share the same content avoidance tags 606. As described above, the content appropriate rating module 232 may weigh or rank recommended media works during recommendation generation. A media work that has been consumed and rated by a member that belongs to two or more groups as the user may have their ratings more heavily weighted when recommending the media work to the user than other group member's ratings (for example User B belongs to the group 600 and 606 with user A).

Figure 7:
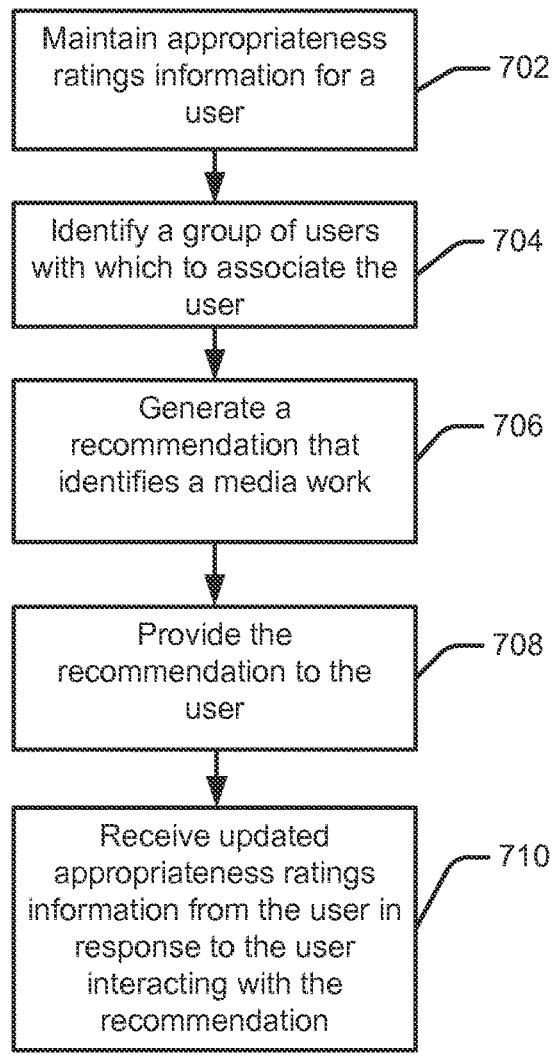
FIG. 7 is a flow diagram of a process for a content appropriate rating feature in accordance with at least one embodiment.

FIG. 7 is a flow diagram of a process for a content appropriate rating feature in accordance with at least one embodiment. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 210 (e.g., utilizing at least one of the content appropriate rating module 232, the media work recommendation module 300, the user profile module 302, the predictive rating module 304, the machine learning module 306, the user interface module 308, and the parental control module 310 in communication with one or more data stores 312) shown in FIGS. 2 and 3, may perform the process 700 of FIG. 7. In FIG. 7 the process 700 may include maintaining appropriateness ratings information for a user at 702. In embodiments, the appropriateness ratings information may be received in response to a user consuming content or media works. The process 700 may include identifying a group of users with which to associate the user at 704. In accordance with at least one embodiment, the user may be associated with a group based at least in part on the appropriateness ratings information for the user and the appropriateness ratings information specified by the group members being within a range for a set of media works.

The process 700 may include generating a recommendation that identifies a media work at 706. As described above, the media work identified in the recommendation may be based on the appropriateness ratings information specified by the group for the media work indicating that the users of the group have consumed the media work and rated the media work similarly to how the user would have rated the media had they consumed it. The process 700 may include providing the recommendation to the user at 708. In embodiments, the recommendation may be provided to the user via a user interface configured to display the recommendation via a network document or application. The process 700 may conclude at 710 by receiving updated appropriateness ratings information from the user in response to the user interacting with the recommendation. For example, the user may provide user feedback in the form of specifying personal age-to-content type rating information for the recently consumed media work which can be utilized to further identify groups to associate the user with by the service provider.

Figure 8:
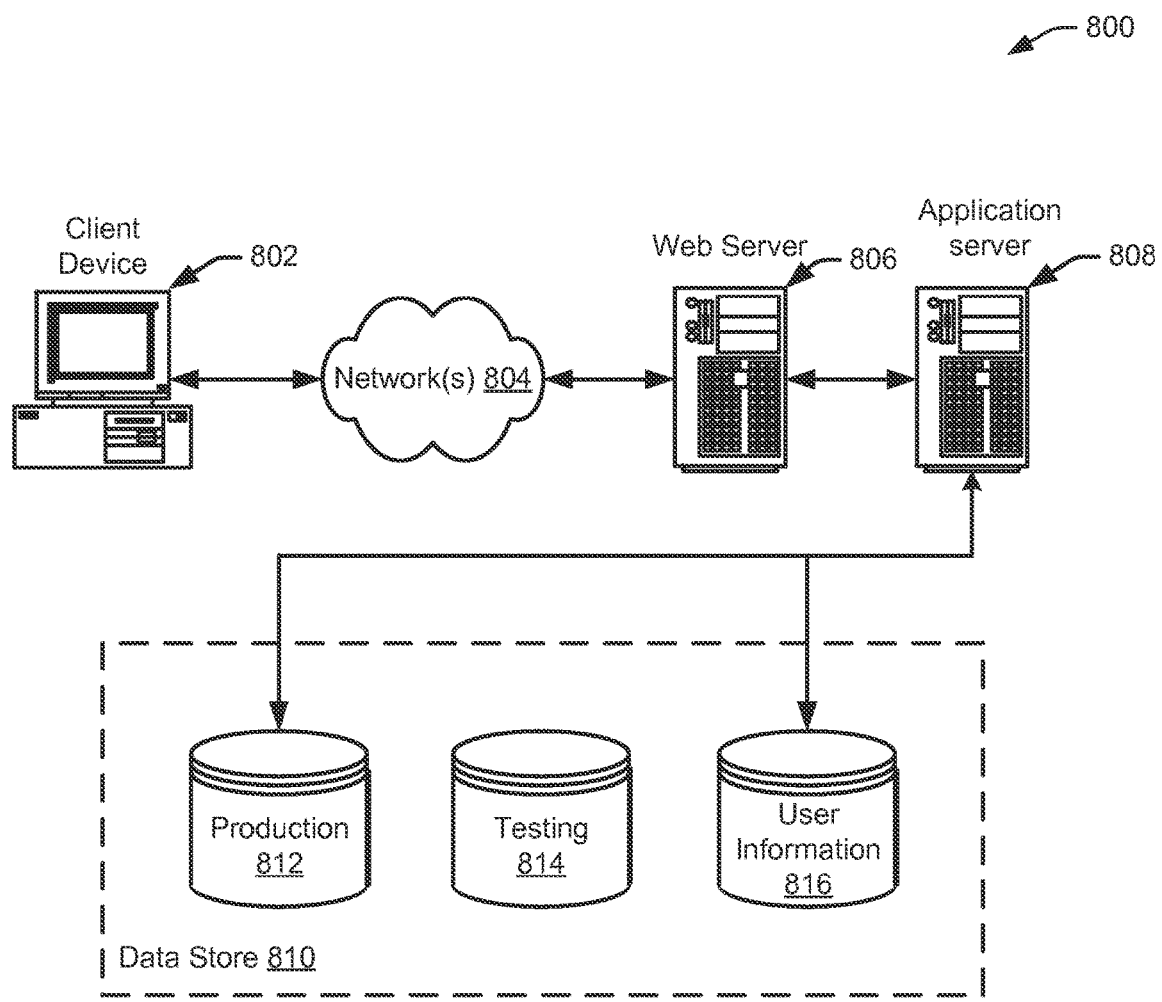
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained, or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, first input associated with a user profile that specifies first ratings information for media data that is different from second ratings information associated with a ratings association, the first ratings information including first age-to-content type ratings for a content type category associated with the media data, the first age-to-content type ratings associated with a value and a content type category identifier pair;

storing third ratings information associated with a plurality of media data;
identifying a group of user profiles with which to associate the user profile based at least in part on the first age-to-content type ratings being within a range of second age-to-content type ratings associated with the group of user profiles for content type categories, the third ratings information including the second age-to-content type ratings;
identifying a content avoidance tag associated with the user profile;
generating, by the computer system, a recommendation that identifies particular media data based at least in part on the second age-to-content type ratings specified by the group of user profiles for the particular media data and is configured to prevent consumption of a set of media data included in the recommendation based at least in part on the content avoidance tag;
causing the recommendation to be presented via a user interface; and
after at least a portion of the particular media data has been presented:
receiving second input associated with the user profile that identifies updated first ratings information for the particular media data for use in subsequent grouping of the user profile.

2. The computer-implemented method of claim 1, wherein identifying the group of user profiles with which to associate the user profile is further based at least in part on the content avoidance tag that is specified by a user associated with the user profile.

3. The computer-implemented method of claim 1, wherein the updated first ratings information is weighted based at least in part on an indicator of the particular media data that indicates an amount of the particular media data that has been presented.

4. The computer-implemented method of claim 1, wherein the range is determined based at least in part on feedback corresponding to selecting the particular media data identified in the recommendation.

5. The computer-implemented method of claim 1, further comprising:
identifying a plurality of groups of user profiles with which to associate the user profile based at least in part on the first age-to-content type ratings of the user profile being within the range of third age-to-content type ratings specified by additional members of the plurality of groups of user profiles; and
generating a new recommendation that includes one or more media data consumed and rated by the additional members of the plurality of groups of user profiles.

6. A non-transitory computer-readable storage medium storing computer-executable instructions that, when executed by a computer system, configure the computer system to perform operations comprising:
receiving first input associated with a user profile that specifies first ratings information for media data that is different from second ratings information provided by a ratings association, the first ratings information including first age-to-content type ratings for a content type category associated with the media data, the first age-to-content type ratings associated with a value and a content type category identifier pair;
storing the first ratings information for a plurality of media data;

receiving an indication that identifies browsing to particular media data of the plurality of media data in a user interface;
determining that the particular media data has not been consumed;
identifying a group of user profiles with which the user profile is associated, the group of user profiles associated with second age-to-content type ratings corresponding to a range of the first age-to-content type ratings included in the first ratings information;
determining third ratings information for the particular media data based at least in part on utilizing the first ratings information and the second age-to-content type ratings associated with the group of user profiles; and
providing the third ratings information for the particular media data to the user interface for presentation.

7. The non-transitory computer-readable storage medium of claim 6, further comprising:
obtaining social network information associated with the user profile; and
providing social network derived ratings information for the particular media data via the user interface based at least in part on the social network information associated with the user profile.

8. The non-transitory computer-readable storage medium of claim 6, wherein identifying the group of user profiles with which the user profile is associated is based at least in part on first demographic information associated with the user profile.

9. The non-transitory computer-readable storage medium of claim 8, further comprising:
ranking second input regarding the second ratings information for the particular media data associated with the group of user profiles based at least in part on second demographic information associated with the group of user profiles and the first demographic information associated with the user profile; and
generating a recommendation identifying a group of media data based at least in part on utilizing the second demographic information and the first demographic information.

10. The non-transitory computer-readable storage medium of claim 6, further comprising:
determining that the user profile is not associated with a particular group of user profiles; and
identifying a difference between the first age-to-content type ratings for the user profile and third age-to-content type ratings associated with the particular group of user profiles.

11. The non-transitory computer-readable storage medium of claim 10, further comprising:
determining the third ratings information for the particular media data on behalf of the user profile based at least in part on utilizing the difference; and
providing a recommendation identifying the particular media data based at least in part on the difference.

12. The non-transitory computer-readable storage medium of claim 6, wherein determining the third ratings information for the particular media data on behalf of the user profile is further based at least in part on utilizing metadata associated with the particular media data.

13. The non-transitory computer-readable storage medium of claim 12, wherein the metadata associated with the particular media data includes at least a transcript of the media data, data indicating a rating specified by the ratings association, first content tags specified by a plurality of users, or second content tags derived by performing image recognition on the particular media data.

14. A computer system, comprising: a processor; and memory including computer-executable instructions that, when executed by the processor, cause the system to at least:
receive, from a user device, input associated a user profile that specifies first age-to-content type ratings for media data that is different from second ratings provided by a ratings association, the first age-to-content type ratings being for a content type category associated with the media data, the first age-to-content type ratings identifying a value and a content type category identifier pair;
store the first age-to-content type ratings for a plurality of media data; generate user profiles, an individual user profile of the user profiles indicating an adjustment for an individual content type category associated with the first age-to-content type ratings;
identify a group of user profiles of the user profiles with which to associate the user profile based at least in part on the first age-to-content type ratings associated with the group of user profiles for content type categories;
receive a selection of a particular user profile from the group of user profiles; and
prevent consumption of the media data by the user based at least in part on second age-to-content type ratings associated with the media data and the particular user profile.

15. The computer system of claim 14, wherein preventing consumption of the media data includes determining that the second age-to-content type ratings associated with the media data adjusted by the individual user profile are below a threshold identified by the first age-to-content type ratings.

16. The computer system of claim 14, wherein generating the user profiles is based at least in part on obtaining social network information associated with the user profile.

17. The computer system of claim 14, wherein preventing consumption of the media data includes providing a notification to the user device, the notification including the second age-to-content type ratings associated with the media data adjusted by the particular user profile and the first age-to-content type ratings, the notification configured to enable overriding the prevention of consumption of the media data.

18. The computer system of claim 14, wherein preventing consumption of the media data includes providing the first age-to-content type ratings to a device attempting to provide the media data.

19. The computer system of claim 14, wherein generating the user profiles is based at least in part on aggregating third age-to-content type ratings for the plurality of media data from a plurality of user profiles.

20. The computer system of claim 14, wherein generating the user profiles is based at least in part on geographic information associated with the user profile, the adjustment for the individual content type category further adjusted based at least in part on the geographic information.

\* \* \* \* \*